(No Model.) 2 Sheets—Sheet 1.
J. G. CRAWFORD.
REVERSING GEARING FOR WASHING MACHINES.
No. 517,646. Patented Apr. 3, 1894.
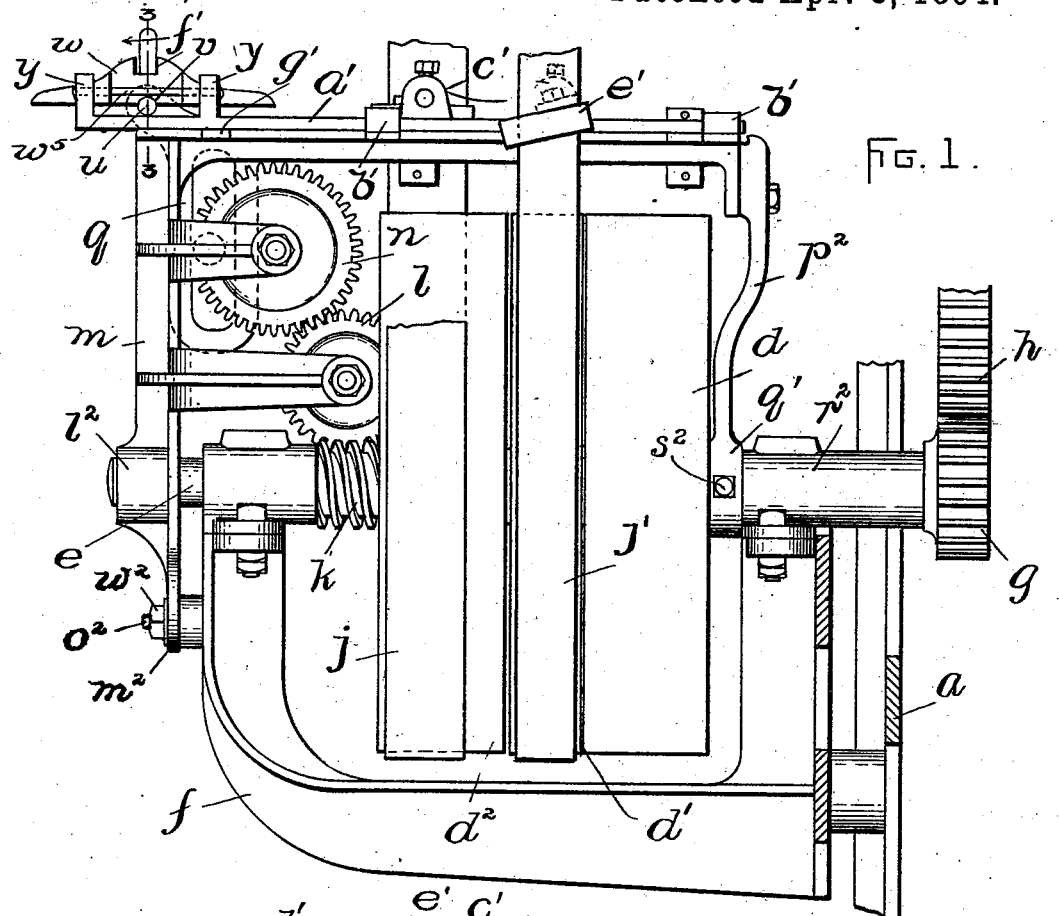
Fig. 1.
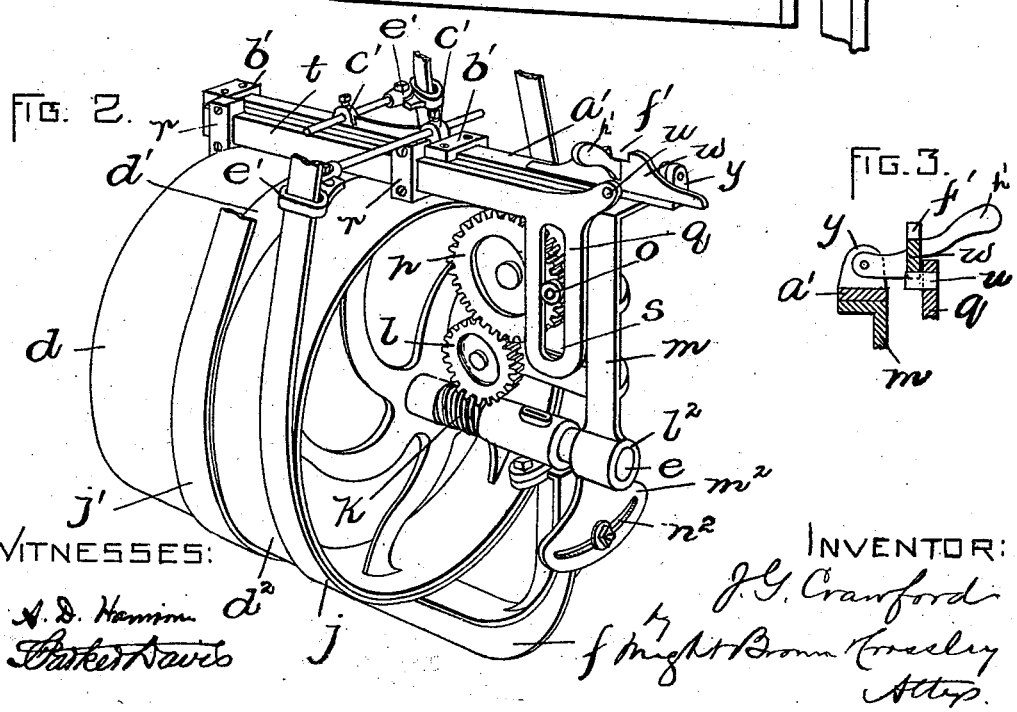
Fig. 2.
Fig. 3.
WITNESSES:
INVENTOR:
J. G. Crawford (No Model.) 2 Sheets—Sheet 2.
J. G. CRAWFORD.
REVERSING GEARING FOR WASHING MACHINES.
No. 517,646. Patented Apr. 3, 1894.
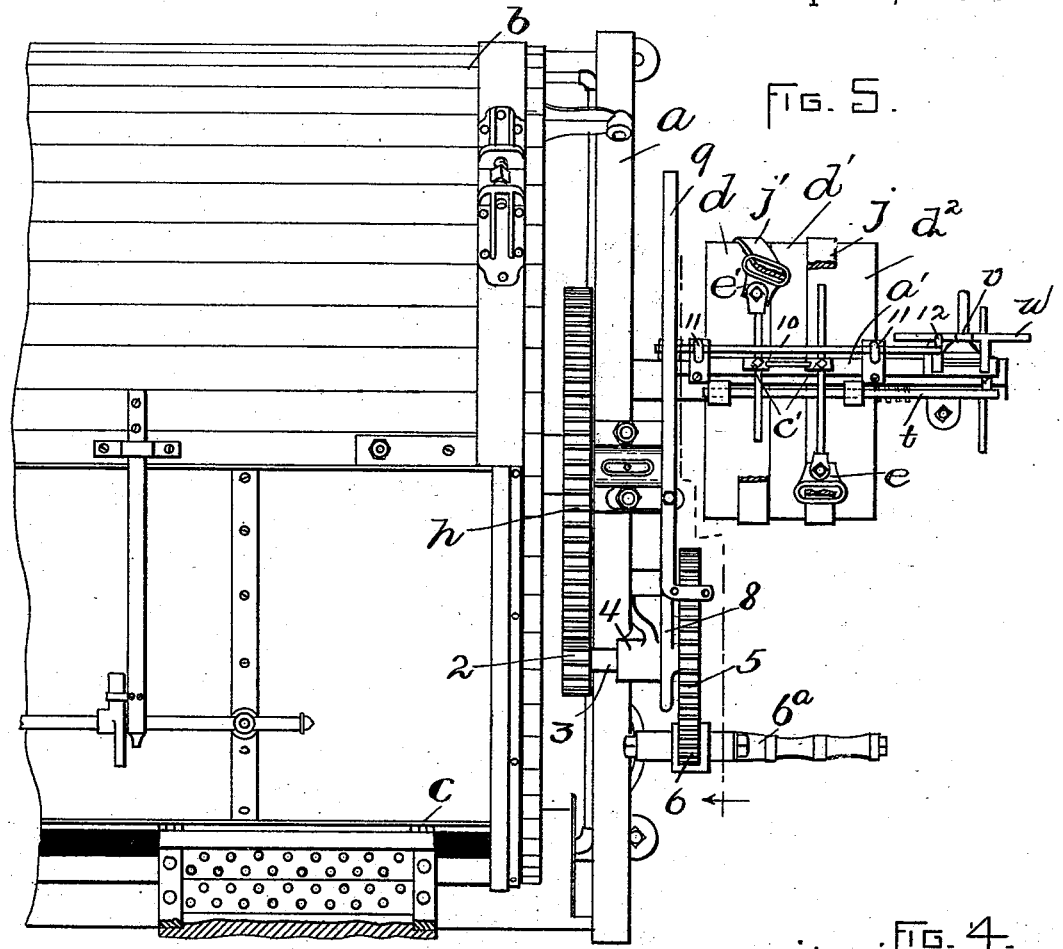
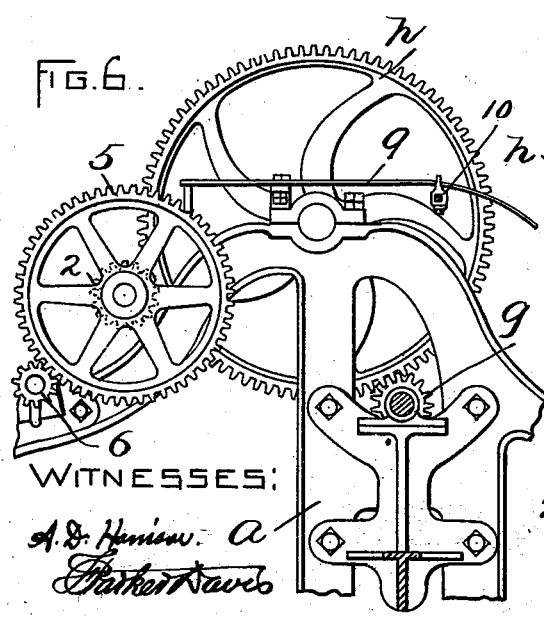
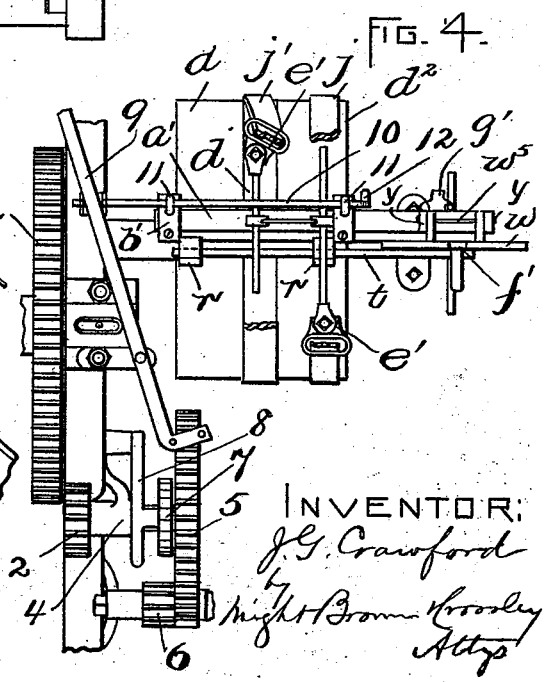
WITNESSES:
A. D. Harrison
Parker Davis
INVENTOR:
J. G. Crawford
by Knight Brown Crosby
Attys

UNITED STATES PATENT OFFICE.

JAMES G. CRAWFORD, OF BOSTON, MASSACHUSETTS, ASSIGNOR TO THE CRAWFORD LAUNDRY MACHINERY COMPANY, OF PORTLAND, MAINE.

REVERSING-GEARING FOR WASHING-MACHINES.

SPECIFICATION forming part of Letters Patent No. 517,646, dated April 3, 1894.

Application filed June 23, 1893. Serial No. 478,595. (No model.)

*To all whom it may concern:*

Be it known that I, JAMES G. CRAWFORD, of Boston, in the county of Suffolk and State of Massachusetts, have invented certain new and useful Improvements in Reversing-Gearing for Washing-Machines, of which the following is a specification.

This invention has for its object to provide a simply-constructed reversing mechanism, especially adapted for automatically reversing the motion of the rotary cylinder of a washing machine; and also to provide means for rotating said cylinder by hand, which means shall so co-act with the reversing mechanism that the two cannot be in operative adjustment at the same time.

The invention consists in the several improvements which I will now proceed to describe and claim.

Of the accompanying drawings, forming part of this specification: Figure 1 shows a rear elevation of the reversing mechanism. Fig. 2 shows a perspective view of the same. Fig. 3 shows a detail section, on line 3—3 of Fig. 1. Fig. 4 shows a top plan view of the reversing mechanism and the means for rotating the cylinder by hand, the latter being illustrated in inoperative adjustment. Fig. 5 shows a similar view, with said means in operative adjustment. Fig. 6 shows an end elevation.

The same letters and numerals of reference indicate the same parts in all the figures.

In the drawings: $a$ represents the supporting-frame; $b$, the outside cylinder; and $c$, the rotating cylinder or "washer."

$d$ $d'$ $d^2$ represent pulleys, mounted on a shaft $e$, the outer end of which is journaled in a bearing upon an arm or support $f$ secured to the frame $a$. To the inner end of said shaft is secured a pinion $g$, meshing with a gear $h$ upon the main or cylinder shaft. The pulleys $d$ $d^2$ are loosely mounted on the shaft $e$, and the central pulley $d'$ is rigidly secured to said shaft, and through said pulley the shaft $e$ is rotated, by belts $j$ $j'$ adapted to engage said pulleys alternately and transmit motion thereto. The pulley $d^2$ has formed upon its hub a worm $k$, which meshes with a gear $l$, journaled in bearings upon a frame $m$, supported by the arm $f$, said gear meshing with a gear $n$, journaled in bearings upon said frame and provided with a pin $o$ upon its front side, having a roll thereon.

$q$ represents a part which I term the "carrier," supported in bearings $r$ $r$ upon the supporting-frame $m$, and provided with a slot $s$ for the reception of the pin and roller on the wheel $n$, which roller engages the sides of said slot and imparts a reciprocating motion to the carrier $q$, in a manner which will be hereinafter described. The carrier is provided with an arm or guide $t$, fitting in the bearings $r$ $r$ upon the frame $m$, and is adapted to move in said bearings in the direction of its length by the rotation of the pulley and the intermediate gears. The carrier has upon its upper end a pin $u$, adapted to fit into a semicircular notch or opening $v$ in a latch $w$, connected by a pivot $w^5$ to bearings $y$ $y$, formed upon a shipper-slide $a'$, fitting in bearings $b'$ $b'$ upon the frame $m$ and adapted to move lengthwise therein. The slide $a'$ has attached to its upper side (and formed thereon) lugs or supports $c'$ $c'$, to which belt-shippers $e'$ $e'$ are adjustably secured. The carrier $q$ is formed to act independently of the shipper-carrying slide $a'$, and has no connection therewith, except through the medium of the latch $w$. When the latch is engaged with the carrier, as shown in Figs. 1, 2 and 4, the shipper-slide $a'$ is reciprocated thereby, bringing the belts alternately into engagement with the fast pulley $d'$ upon the shaft $e$, and communicating motion to the inside cylinder or washer through the shaft $e$ and the described connections therewith. The period of rotation in one direction of the washer cylinder is determined by the carrier-operating wheel $n$, which during one revolution brings both belts into engagement with the pulley $d'$ (the belts running in opposite directions), causing the rotation of the washer in one direction only during substantially one-half of a revolution of the gear. The belt $j$ is of greater width than the belt $j'$, the arrangement being such that the first-named belt may, when engaged with the driving pulley $d'$ to rotate the cylinder in one direction, have sufficient contact with the pulley $d^2$ to insure its continued rotation, so that the carrier-operating mechanism may be continuously operated by the rotation of said pulley. The latch $w$ has formed in one edge a notch $f'$, adapted to engage a projection $g'$ formed on the supporting-frame $m$, the arrangement being such that, when the machine is to be stopped, the operator may, by grasping the handle $h'$ formed on the latch, turn the latch upon its bearings to the inoperative position shown in Fig. 5, in which position the notch $f'$ is brought into engagement with the projection $g'$ and the belts are held engaged with the loose pulleys.

Means are provided for turning the cylinder by hand, for purposes of filling and discharging it, and for simultaneously rendering the reversing mechanism inoperative, so that there can be no possibility of the driving power affecting the cylinder while it is adjusted for turning by hand. A spur 2, arranged to mesh with the gear $h$, is mounted on a spindle 3, fitting a bearing 4 on the frame $a$ and adapted to slide therein so as to throw the spur in and out of engagement with the gear. A gear 5 is mounted on the opposite end of said spindle, and a spur 6, mounted on a spindle supported in a bearing on the frame $a$, is adapted to mesh with the said gear 5, said spindle being squared at the outer end to receive a crank $6^a$. A ratchet 7 is fixed on the spindle 3, and a pawl 8, pivoted to a stationary support, is arranged to engage said ratchet. A horizontal lever 9 carries pins at one end, which embrace the gear 5, and at the opposite end said lever engages a slide 10, which fits in guides 11 on the bearings of the shipper $a'$ and has a lateral projection 12.

The operation is as follows: When it is desired to throw the cylinder out of gear with the power, and to turn it by hand, as when filling or discharging it, the latch $w$ is first thrown back on its pivot, and its notch $f'$ engaged with the projection $g'$. This shifts the belts onto the loose pulleys. Next the spur 2 is moved into engagement with the gear $h$, by shifting the lever 9. This also throws the gear 5 into mesh with the crank-spur 6, and the pawl 8 is lifted by hand to permit the ratchet 7 to pass under it. Now, by applying the crank $6^a$, the cylinder may be turned in one direction as desired, and will be held by the pawl and ratchet from rotating in the opposite direction. The movement of the lever 9, which throws the parts into gear, also moves the slide 10 sufficiently to bring the lateral projection 12 thereof over the latch $w$, and the latter is thereby locked in its rearward position, so that there is no possibility of the reversing mechanism being rendered operative while the hand-operating connection is maintained. Therefore this connection must be broken before the machine can be restored to operation. This arrangement insures safety in running the machine, and prevents carelessness on the part of the operator from causing disaster.

The frame $m$, which supports the reversing mechanism, is adjustable radially to provide for variations in the position of shafting from which the belts are driven, so that the machine can be readily adapted to different conditions existing in different localities. To this end, I provide the frame with a hub $l^2$, adapted to surround the driving-shaft $e$, and having a downwardly-projecting segmental portion $m^2$, provided with a slot $n^2$ for the reception of a bolt $o^2$ secured to the supporting arm $f$. The rear end of the frame $m$ is supported by a standard $p^2$, the lower end of which is provided with a collar $q'$, which surrounds the bearing-box $r^2$ of the shaft, and is secured from turning thereon by a set-screw $s^2$, as shown in Fig. 1. By loosening the nut $w^2$ upon the bolt $o^2$, and the set-screw in the hub of the standard $p^2$, the frame may be readily swung in either direction to any point desired.

Having thus described my invention, what I claim as new, and desire to secure by Letters Patent, is—

1. Reversing gearing, comprising loose and tight pulleys on a driven shaft and belts engaging the same, a sliding carrier reciprocated by connection with one of the loose pulleys, a belt-shipper, a latch for connecting said shipper with the sliding carrier, hand-turning means arranged to be shifted in and out of gear, and means whereby the shifting of said hand-turning means locks the latch in inoperative position.

2. Reversing gearing, comprising loose and tight pulleys on a driven shaft and belts engaging the same, a sliding carrier reciprocated by connection with one of the loose pulleys, a belt-shipper, a latch pivoted to the shipper and adapted to engage the sliding carrier and also to be thrown to an inoperative position where it holds the belts on the loose pulleys, hand-turning gear arranged to slide in and out of operative adjustment, a lever for operating said gear, and a slide connected with said lever and arranged to be moved thereby to a position where it locks the latch in its inoperative adjustment, substantially as described.

In testimony whereof I have signed my name to this specification, in the presence of two subscribing witnesses, this 15th day of June, A. D. 1893.

JAMES G. CRAWFORD.

Witnesses:
A. D. HARRISON,
F. PARKER DAVIS.